No. 694,740. Patented Mar. 4, 1902.
G. G. GUENTHER.
TREE TRANSPLANTER.
(Application filed Oct. 23, 1900.)
(No Model.)

Witnesses
Edw. S. Duvall, Jr.
F. M. Keats

Inventor
George G. Guenther.
by Lynn Helm
Attorney

THE NORRIS PETERS CO., PHOTO-LITHO., WASHINGTON, D. C.

UNITED STATES PATENT OFFICE.

GEORGE G. GUENTHER, OF LOS ANGELES, CALIFORNIA.

TREE-TRANSPLANTER.

SPECIFICATION forming part of Letters Patent No. 694,740, dated March 4, 1902.

Application filed October 23, 1900. Serial No. 34,090. (No model.)

*To all whom it may concern:*

Be it known that I, GEORGE G. GUENTHER, a citizen of the United States, residing at Los Angeles, county of Los Angeles, State of California, have invented a new and useful Improvement in Agricultural Implements— namely, Tree-Transplanters—of which the following is a specification.

My invention relates to a tree-transplanter; and the object of my improvement is to provide an agricultural implement for the purpose of cutting away the soil below the surface surrounding the roots of a tree and also the smaller roots without disturbing the tree in the earth and accomplishing the transplanting of the tree by removing therewith sufficient earth to protect the roots and not retard the growth.

A number of trees are transplanted in park, landscape gardening, and nurseries. I propose to transplant a tree without disturbing the earth in which it is grown and enabling the tree to be lifted, removed, and transplanted with sufficient earth undisturbed to protect it in the transplanting. I design to effect this by means of a tree-transplanter, using a sharp knife to cut away horizontally the earth below the surface and under the roots of the tree. I attain these objects by the mechanism in the accompanying drawings, in which—

Figure 1:
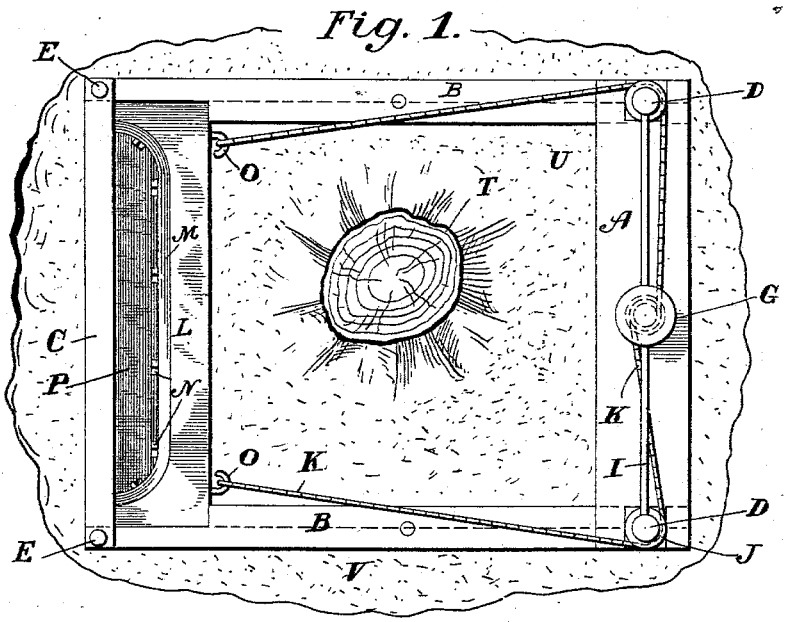
Figure 2:
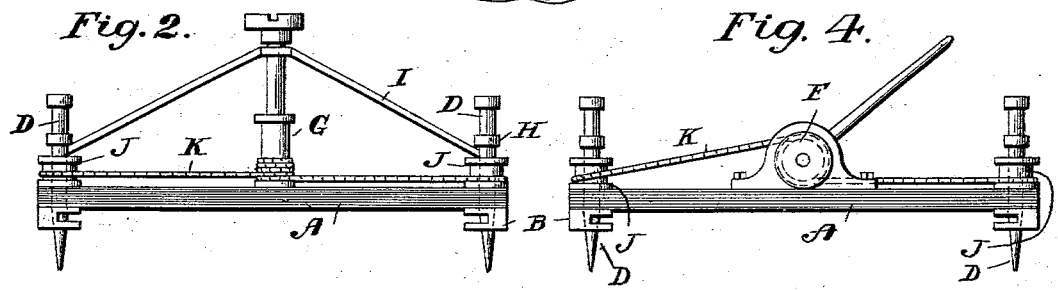
Figure 4:
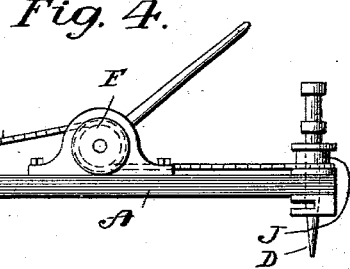
Figure 5:
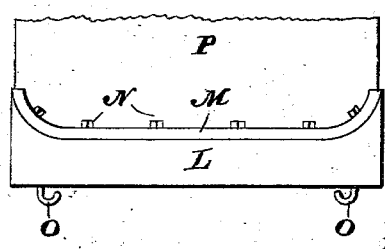
Figure 6:
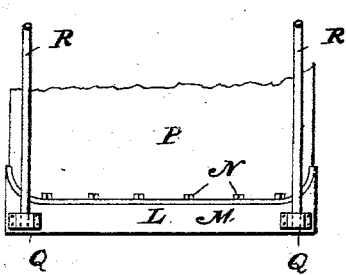
Figure 3:
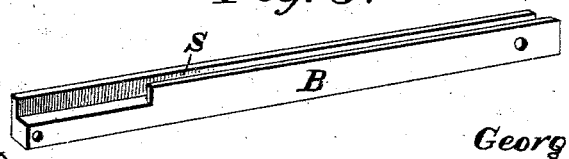

Figure 1 is a plan view showing transplanter in position for use. Fig. 2 is a front end elevation of the device. Fig. 3 is a detail view in perspective of one of the side bars of the transplanter. Fig. 4 is a front end elevation showing a modified form of chain-operating device. Fig. 5 is a plan view in detail of the cutter with apron attached. Fig. 6 is a detail view in plan of a modified form of cutter adapted to be used for small plants.

Similar letters refer to similar parts of the several views.

A is the front bar of the frame; B is the side bar; C, the rear bar, all constituting the frame made of wood or metal.

D is pin piercing side bar B and front bar A and driven into ground to make frame firm in front and supporting capstan-brace and chain-sheath.

E is pin piercing side bar B and rear bar C and driven in ground in like manner to make frame firm.

F is whim in center of bar A; G, capstan to be fastened to bar A for same purpose, if desired, as alternative form of construction.

H is shoulder-head of pin D.

I is capstan-brace, held in shoulder-head H.

J is chain-sheath around pin D.

K is chain connecting with capstan G or whim F, passing around pin D through chain-sheath J.

L is cutter or knife.

M is clamp-bar fastened to cutter L.

N designates bolt and nut fastenings passing through clamp-bar M.

O is hook attached to cutter L, to which is attached chain K.

P is bagging attached to clamp-bar M.

Q is socket in cutter L, in which is inserted hand push-bar R.

S is groove or slide inside bar B.

T is stem of tree.

U is earth to be removed in contact with tree, and V is trench around tree, in which transplanter is operated.

The bagging P may or may not be attached as may be desirable when tree is elevated with derrick to enable it to pass through underneath the roots of the tree.

The operation of the tree-transplanter is as follows: A trench V is dug around tree T at the proper distance, and side bars B are placed in the trench, and thereupon are placed the front bar A and the rear bar C, through which are inserted the pins D and E at the front and rear. This frame having been put in place in the bottom of the trench V and securely fastened, the ends of the cutter L are inserted in the grooves S of the side bars B, and the chains K, from the capstan G or the whim F, passing through the sheaths J and around the pins D, are fastened to the hooks O of the cutter.

If it is desired, the bagging P is attached to the clamp-bar M of the cutter. The movement of the capstan or whim tightening the chains draws the cutter L through the grooves of the side bars and underneath the tree, completely severing the ground desired to be removed from the earth below and the roots at the same time, bagging, if desired, the ball of earth thus cut out with the tree.

In the case of small trees in nursery-stock the cutter may be used without capstan or whim, but with simply hand push-bars R, pushing cutter L through the soil underneath the tree. The transplanter above described has for its object and use to provide a safe and practical method of transplanting trees without disturbing or shaking the tree or disturbing the soil immediately surrounding the roots.

I claim as my invention and desire to secure by Letters Patent—

1. In a transplanter, the combination with a frame comprising side and end bars, of a transversely-disposed cutter, slidably mounted in the side bars of the frame, and means for actuating the said cutter, substantially as described.

2. In a transplanter, the combination with a frame comprising side and end bars, of a transversely-disposed cutter slidably mounted in the side bars of the frame, an apron secured to said cutter and movable therewith, and means for actuating the said cutter.

3. In a transplanter, the combination with a frame comprising side and end bars, of a cutter slidably mounted in the side bars, transversely of the frame, a capstan mounted at the front of said frame and chains secured to said cutter and operated by said capstan to draw the cutter along said frame, substantially as described.

4. In a transplanter, the combination with a frame, comprising side and end bars, of a cutter slidably mounted in the side bars, transversely of the frame, an apron secured to said cutter, and means for actuating the said cutter, consisting of a capstan mounted at the front of said frame, and chains secured to said cutter and operated by said capstan to draw the cutter along said frame, substantially as described.

5. In a transplanter, the combination with a knockdown frame, comprising the end bars and the longitudinally-slotted side bars, pins passing through the overlapping ends of the bars of the frame and projecting below the under side thereof, whereby the frame may be secured immovably to the ground, a cutter slidably mounted in the slots of the side bars, an apron secured to said cutter and movable therewith, and means for actuating the said cutter, consisting of a capstan mounted on said frame and chains secured to said cutter and operated by said capstan to move the cutter, substantially as described.

In witness that I claim the foregoing I have hereunto subscribed my name, this 15th day of October, 1900, at Los Angeles, California.

GEORGE G. GUENTHER.

Witnesses:
ROGER S. PAGE,
AGNES M. STAMPS.